United States Patent
Strømsvik et al.

(10) Patent No.: US 10,164,430 B2
(45) Date of Patent: Dec. 25, 2018

(54) SUBSEA POWER DISTRIBUTION DEVICE AND SYSTEM

(71) Applicant: FMC Kongsberg Subsea AS, Kongsberg (NO)

(72) Inventors: Torbjørn Strømsvik, Asker (NO); Ragnar Eretveit, Kongsberg (NO); Ola Jemtland, Oslo (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 305 days.

(21) Appl. No.: 14/785,311

(22) PCT Filed: Apr. 15, 2014

(86) PCT No.: PCT/EP2014/057609
§ 371 (c)(1),
(2) Date: Oct. 16, 2015

(87) PCT Pub. No.: WO2014/170320
PCT Pub. Date: Oct. 23, 2014

(65) Prior Publication Data
US 2016/0072284 A1    Mar. 10, 2016

(30) Foreign Application Priority Data
Apr. 17, 2013  (NO) .................................. 20130522

(51) Int. Cl.
*H02J 3/00* (2006.01)
*H01F 27/02* (2006.01)
(Continued)

(52) U.S. Cl.
CPC ................ *H02J 3/00* (2013.01); *H01F 27/02* (2013.01); *H01F 27/12* (2013.01); *H02G 9/02* (2013.01);
(Continued)

(58) Field of Classification Search
CPC .......... H02J 3/00; H01F 27/02; H01F 27/022; H01F 27/12
See application file for complete search history.

(56) References Cited

U.S. PATENT DOCUMENTS 1,815,842 A    11/1927  Gay
4,240,122 A    12/1980  Smith
(Continued)

FOREIGN PATENT DOCUMENTS

DE    10005176 A1 *  8/2001  ............. H01F 30/04
EP    2 011 960 A2    1/2009
(Continued)

OTHER PUBLICATIONS

Hazel, Terence, et al. "Subsea high-voltage power distribution." Petroleum and Chemical Industry Conference (PCIC), 2011 Record of Conference Papers Industry Applications Society 58th Annual IEEE. IEEE, 2011.*

*Primary Examiner* — Ryan Johnson

(57) ABSTRACT

A subsea power distribution device and system. The subsea power distribution device comprises a watertight housing accommodating at least one transformer, the transformer having a primary winding and a plurality of secondary windings; input terminals, electrically connected to the primary winding and arranged to be connected to a remote power supply; output terminals, electrically connected to the secondary windings and arranged to be connected to subsea power consuming devices. The switches are arranged to break the connections between each secondary winding and a corresponding output terminal, and the switches are arranged within the watertight housing.

18 Claims, 2 Drawing Sheets

(51) Int. Cl.
*H01F 27/12* (2006.01)
*H02G 9/02* (2006.01)
*H02H 7/04* (2006.01)
E21B 33/035 (2006.01)
H02H 7/26 (2006.01)

(52) U.S. Cl.
CPC ........... *H02H 7/04* (2013.01); *E21B 33/0355* (2013.01); *H02H 7/26* (2013.01)

(56) References Cited

U.S. PATENT DOCUMENTS

| | | |
|---|---|---|
| 6,420,976 B1 | 7/2002 | Baggs et al. |
| 6,867,364 B2 | 3/2005 | Hafskjold et al. |
| 2009/0226262 A1* | 9/2009 | Karstad .................. B63G 8/08 405/191 |

FOREIGN PATENT DOCUMENTS

| | | |
|---|---|---|
| EP | 2 293 407 A1 | 3/2011 |
| GB | 2 335 216 A | 9/1999 |
| WO | WO 02/072999 A1 | 9/2002 |
| WO | WO 03/106813 A1 | 12/2003 |
| WO | WO 2007/055594 A1 | 5/2007 |
| WO | WO 2012/034984 A2 | 3/2012 |

* cited by examiner

SUBSEA POWER DISTRIBUTION DEVICE AND SYSTEM

TECHNICAL FIELD OF THE INVENTION

The present invention relates to distribution of electric power to subsea equipment.

More particularly, the invention relates to a subsea power distribution device, comprising a watertight housing accommodating a transformer, the transformer having a primary winding and a plurality of secondary windings; input terminals, electrically connected to the primary winding, arranged to be connected to a remote power supply; and output terminals, electrically connected to the secondary windings, arranged to be connected to subsea power consuming devices.

The invention also relates to a corresponding subsea power distribution system and method.

BACKGROUND OF THE INVENTION

In offshore installations, such as subsea production installations, there is an increasing use of electrically powered subsea equipment. Such subsea equipment may include, e.g., compressors, pumps, and any other electrically powered subsea equipment.

The electrical power to be distributed to such subsea equipment may be supplied from land, e.g. an onshore power plant, or from an offshore power generating facility, e.g. on a ship or platform.

Such subsea equipment may have high power requirements, and electric power must usually be transferred across long distances. In order to provide an efficient power transfer across long distances, a high voltage is used for the remote power supply.

The high voltage power supply is connected to subsea power distribution device which includes a transformer that provides a lower voltage power supply which is connected to subsea power consuming devices. The transformer may be accommodated in a watertight housing. The transformer may be a multi-winding transformer, having a primary winding and a plurality of secondary windings. The primary winding is electrically connected to input terminals which are arranged to be connected to the remote, high voltage power supply. The secondary windings are electrically connected to output terminals which are further arranged to be connected to the subsea power consuming devices.

A disadvantage of such an arrangement is that the secondary transformer windings have no protection against a failure in one of the circuits connected to a secondary winding, e.g. a ground fault, an overload or a short circuit in one of the subsea power consuming devices.

Such a failure may therefore result in the shutdown or disconnection of the entire transformer. This has substantial operational consequences, e.g. loss of operational time and costs, and should be avoided when possible.

SUMMARY OF THE INVENTION

Disadvantages and/or shortcomings of background art have been overcome by a device and a system as have been set forth in the appended claims.

BRIEF DESCRIPTION OF THE DRAWINGS

The present invention will be discussed in closer detail in the following with reference to the drawings, wherein.

DETAILED DESCRIPTION OF THE INVENTION

Figure 1:
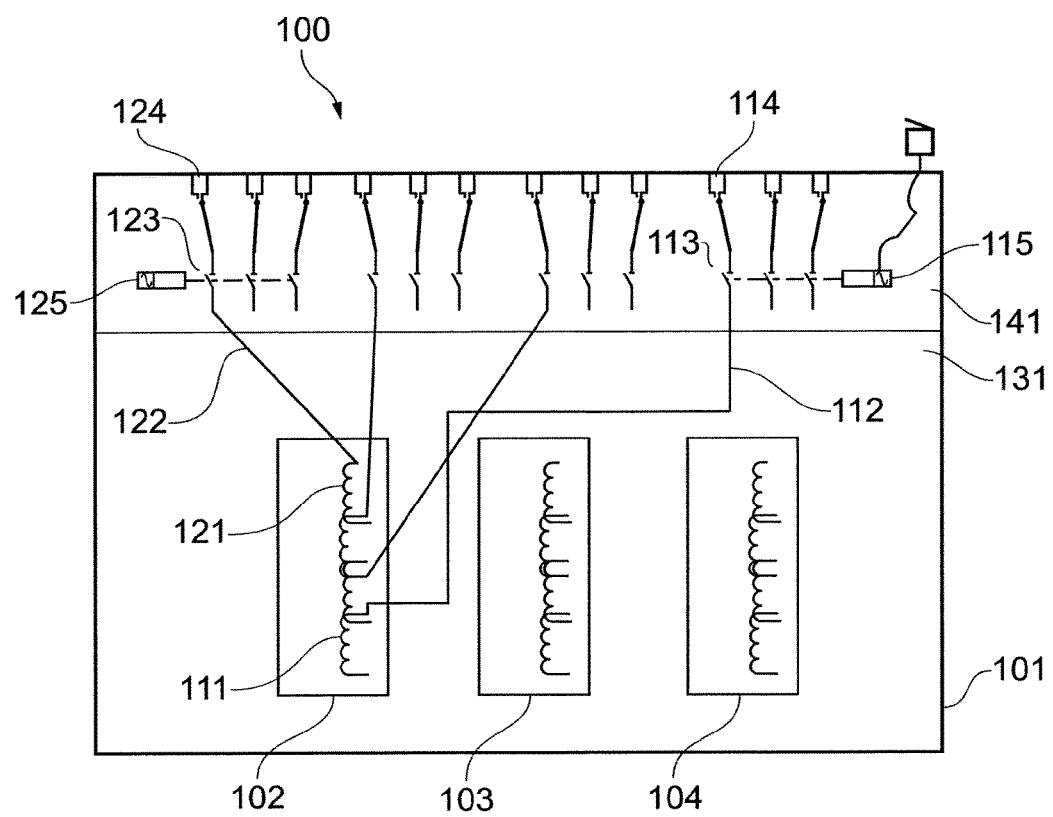
FIG. 1 is a schematic diagram illustrating aspects of a subsea power distribution device in accordance with one embodiment of the present invention.

FIG. 1 is a schematic diagram illustrating aspects of a subsea power distribution device in accordance with one embodiment of the present invention.

The subsea power distribution device 100 comprises a watertight housing 101 which accommodates at least one transformer 102. Also shown are additional transformers 103, 104, which may also be included in the watertight housing 101. As will be appreciated, any suitable number of transformers, for instance 1, 2, 3 or 4 transformers, may be included in the power distribution device. Each additional transformer 103, 104 may, e.g., be equal to, similar to, or different from the transformer 102.

The transformer 102 has a primary winding and a plurality of secondary windings, i.e., a multiwinding transformer. In FIG. 1 the primary winding has not been shown, for simplicity of illustration. The plurality of secondary windings, which in this example includes 4 secondary windings, has been illustrated within the transformer 102.

Each secondary winding feeds one power consuming device. As used herein, the term power consuming device should be understood to mean either one single power consuming unit or a power distribution circuit segment which may include a plurality of power consuming units.

Although not illustrated in FIG. 1, the subsea power distribution device 100 includes input terminals that are electrically connected to the primary winding. These input terminals are also arranged to be connected to a remote power supply.

The remote power supply may have a high supply voltage of typically 50kV-150 kV, for instance 90 kV. The high voltage power may be transferred over a long distance, such as from land, e.g. an onshore power plant, or from an offshore power generating facility, e.g. on a ship or platform, to the subsea site.

The power distribution device 100 further includes output terminals which are electrically connected to the secondary windings and arranged to be connected to subsea power consuming devices.

The secondary windings may typically supply an operating voltage in the range of 10 kV to 40 kV, or more particularly, in the range of 20 kV to 36 kV, e.g., 24 kV.

Further, switches are arranged to break the connections between each secondary winding and a corresponding output terminal. The switches, including the illustrated switches 113 and 123, are arranged within the watertight housing.

The arrangement of the switches arranged to break the connections between each secondary winding and a corresponding output terminal avoids a complete production stop in the event of an electrical fault in a secondary circuit, e.g., an overload, short-circuit or earth fault in a subsea power consuming device. Each switch makes it possible to isolate each separate secondary circuit in order to disconnect only the circuit which has a fault. When a secondary circuit is to be connected or disconnected, such isolating switches will give the opportunity of performing such a circuit isolation operation without disconnecting the complete subsea transformer.

The switches used in the power distribution device may e.g. be designed for operating in a voltage range of 10 kV to 40 kV, or more particularly, in the range of 20 kV to 36 kV, e.g., 24 kV. Advantageously, dielectric insulating fluid (oil) is used to fill the switch gap, which implies that a switch rated for a particular voltage when operated in air may operate at a substantially higher (such as approximately three times higher) voltage when insulating fluid (oil) is used.

As a simplified, illustrative example, shown in FIG. 1, one secondary winding 111 in the transformer 102 is connected through a conductor 112 to a switch 113. A further connector is connected between the switch 113 and the output terminal 114, which is arranged to be connected to a subsea power consuming device. Likewise, another secondary winding 121 in the transformer 102 is connected through a conductor 122 to a switch 123. A further connector is connected between the switch 123 and the output terminal 124, which is also arranged to be connected to a subsea power consuming device.

Advantageously, each switch, e.g. the switch 123, is placed as close as possible to the secondary winding of the transformer, so as to minimize the risk of a fault between the secondary winding and the switch, since such a fault cannot be isolated by means of the switch.

Preferably, each secondary winding of the transformer, such as the transformer 102, is provided with a corresponding switch, connected to the secondary winding through a conductor.

Each switch includes a switch actuator, which actuates the switching function of the switch. For instance, the switch 113 is actuated by the switch actuator 115. Preferably, as shown, two other, correspondingly operated switches are actuated by the same switch actuator 115.

Likewise, the switch 123 is actuated by another switch actuator 125. Preferably, as shown, two other, correspondingly operated switches are actuated by the same switch actuator 125.

In a particular advantageous aspect, the watertight housing 101 is configured with a first compartment 131 and a second compartment 141. The second compartment 141 is separate from the first compartment 131. Further, in this configuration, the transformer is arranged within the first compartment 131 while the switches are arranged in the second compartment 141.

The first compartment 131 and the second compartment 141 are advantageously oil-filled. Advantageously, the oil used is a dielectric isolating oil of a type known as transformer fluid. An example is known as MIDEL 7131.

The first 131 and second 141 compartments may be configured as separate parts or as portions of a divided enclosure. The compartments, including the divided enclosure, should be designed and arranged to withstand subsea environment conditions, i.e. water pressure, salt, temperature variations, etc. To this end, the compartments may be made of a strong steel casing with cooling fins for heat exchange. The enclosure may advantageously include a top cover and suitable bushing boxes. Appropriate seals, closures, penetrators and connectors to sea-water for subsea environment may be chosen as appropriate by the skilled person.

In one aspect, the switch actuator is (or the switch actuators are) contained within the watertight housing.

Hence, as shown, the switch actuators 115 and 125 are contained within the watertight housing 101.

More specifically, in the configuration wherein the watertight housing 101 has a first compartment 131 and a second compartment 141, the switch actuator is advantageously contained within the second compartment 141. In this configuration, electric penetrators are needed between the first and second compartments.

In an alternative aspect, the switch actuator is arranged external to the watertight housing. In this case, it may be necessary to arrange a mechanical shaft through the shell of the watertight housing. This leads however to certain disadvantages with respect to obtaining a durable and reliable seal between the shaft and the shell of the watertight housing. This problem has been solved by arranging a magnetic coupling between the actuator's electric motor, arranged outside the watertight housing, and a movable mechanism of the switch.

In any of the above aspects, the switch actuator may be connected to and arranged to be controlled by a control unit which is arranged separately from the watertight housing.

The switch actuator may advantageously be an electrical switch actuator, e.g. including a motor, mechanical drive gear, a power supply such as a battery, and a control unit. The electric switch actuator may be configured to be fail safe. The battery may include an internal battery, an external battery, or a combination.

Alternatively, the switch actuator may be a hydraulic or electro-hydraulic switch actuator.

Figure 2:
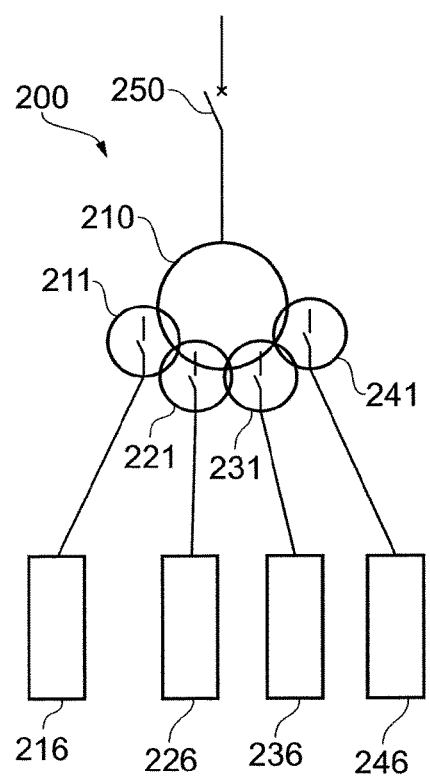
FIG. 2 is a schematic block diagram illustrating certain further aspects of a subsea power distribution device.
Figure 3:
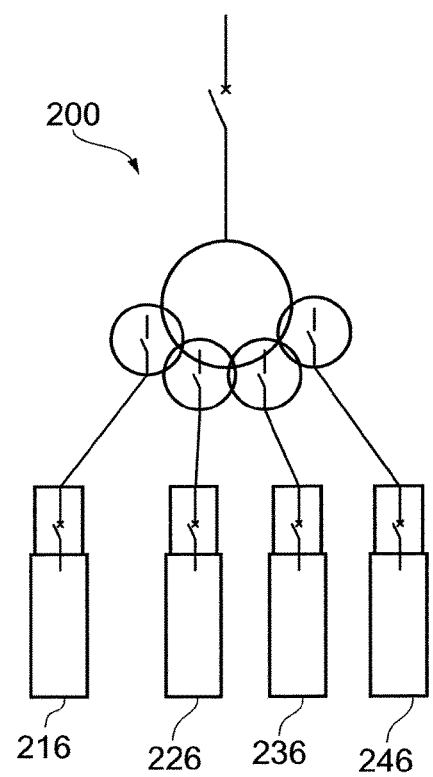
FIG. 3 is a schematic block diagram illustrating certain further aspects of a subsea power distribution device.

FIGS. 2 and 3 are schematic block diagrams illustrating certain further aspects of a subsea power distribution device.

The subsea power distribution device 200 comprises a watertight housing in the same way as the device 100 described above with reference to FIG. 1, although this housing has not been illustrated in FIGS. 2 and 3. The watertight housing accommodates a transformer which has a primary winding, schematically illustrated at 210 and a plurality of secondary windings; namely; the four secondary windings 211, 221, 231 and 241. Input terminals (schematically illustrated as one line) are electrically connected to the primary winding 210 and arranged to be connected to a remote power supply. In FIG. 2, a switch 250 has been shown to be interconnected in the supply line between the remote power supply and the primary winding 250.

The subsea power distribution device 200 further comprises output terminals, which are electrically connected to the secondary windings and arranged to be connected to subsea power consuming devices, illustrated at 216, 226, 236 and 246. Switches, illustrated in FIGS. 2 at 211, 221, 231 and 241 respectively, are arranged to break the connections between each secondary winding and a corresponding output terminal which leads to a corresponding subsea power consuming device. The switches are arranged within the watertight housing, in a corresponding way as disclosed and illustrated for the power distribution device 100 illustrated in FIG. 1.

Additionally, the subsea power distribution device 200 may include any of the optional features, or any combination of the optional features, which have already been described above for the power distribution device 100 illustrated in FIG. 1.

FIG. 3 illustrates a similar configuration as that shown in FIG. 2. Each subsea power consuming device may include an additional power switch within the device itself, or more specifically, as suggested in FIG. 3, in a separate switch unit attached to or included in the same housing as the corresponding subsea power consuming device. The power switches included in the power consuming device may e.g. be a power switch in a Variable Speed Device (VSD).

The subsea power distribution device disclosed above, with any combination of aspects and possible or optional features, may be included in a subsea power distribution system. The subsea power distribution system comprises a remote power supply, with a high voltage of typically 50 kV-150 kV, for instance 90 kV. The high voltage power may be transferred over a long distance, such as from land, e.g. an onshore power plant, or from an offshore power generating facility, e.g. on a ship or platform, to the subsea site.

The subsea power distribution system further comprises a subsea power distribution device as disclosed above, e.g. as shown and described with reference to FIGS. 1, 2 and 3, and a plurality of subsea power consuming devices, such as compressors, pumps, etc.

The subsea power distribution system also includes primary electrical connections which interconnect the remote power supply and the input terminals of the subsea power distribution device.

The subsea power distribution system also includes secondary electrical connections which interconnect the output terminals of the subsea power distribution device and the subsea power consuming devices.

It should be appreciated by the skilled person that the disclosed subsea power distribution device and subsea power distribution system may employ three-phase AC or one-phase AC supply voltage/current, circuits and elements.

The disclosed subsea power distribution device and subsea power distribution system may have at least some of the following advantages:

A ground fault, or another electrical fault, in one secondary circuit may have no impact on the other secondary circuits.

The possibility of isolating one faulty circuit so this fault does not influence the transformer operation, and Installation or removal of subsea power consuming devices can be done with the remaining parts of the subsea power distribution system in operation, e.g. during maintenance and/or repair.

Shutdown or disconnection of the entire transformer would have substantial operational concerns, e.g. loss of operational time and costs. The disclosed subsea power distribution device and system overcomes such shortcomings of related background solutions.

The invention claimed is:

1. A subsea AC power distribution device, comprising:
   a watertight housing within which at least one transformer is positioned, the transformer having a primary winding and a plurality of secondary windings;
   an input terminal which is electrically connected to the primary winding and is arranged to be connected to a remote AC power supply;
   a number of output terminals, each of which is electrically connected to a corresponding secondary winding and is arranged to be connected to a corresponding subsea power consuming device; and
   a number of switches, each of which is arranged to break the connection between one of said output terminals and a corresponding secondary winding;
   wherein the switches are arranged within the watertight housing;
   wherein each switch includes a corresponding switch actuator; and
   wherein the watertight housing comprises a first compartment and a second compartment which is separate from the first compartment, and wherein the transformer is arranged within the first compartment and the switches are arranged within the second compartment.

2. The subsea power distribution device according to claim 1, wherein each secondary winding is provided with a corresponding switch.

3. The subsea power distribution device according to claim 1, wherein both the first compartment and the second compartment are filled with an oil.

4. The subsea power distribution device according to claim 1, wherein each switch actuator is contained within the watertight housing.

5. The subsea power distribution device according to claim 4, wherein each switch actuator is contained within the second compartment.

6. The subsea power distribution device according to claim 1, wherein each switch actuator is arranged external to the watertight housing.

7. The subsea power distribution device according to claim 6, wherein each switch actuator actuates its corresponding switch by means of a mechanical shaft extending through a portion of the watertight housing.

8. The subsea power distribution device according to claim 6, wherein each switch actuator actuates its corresponding switch by means of a magnetic coupling through a portion of the watertight housing.

9. The subsea power distribution device according to claim 1, wherein each switch actuator is connected to and arranged to be controlled by a control unit which is arranged separately from the watertight housing.

10. The subsea power distribution device according to claim 1, wherein each switch actuator is an electrical switch actuator.

11. The subsea power distribution device according to claim 1, wherein the switch actuator is a hydraulic switch actuator.

12. The subsea power distribution device according to claim 1, further comprising:
    a number of second switches, each of which is arranged to break the connection between one of said output terminals and a corresponding one of said subsea power consuming devices;
    wherein each second switch is contained within a respective switch unit which is attached to or positioned within a housing for the subsea power consuming device.

13. An AC subsea power distribution system comprising:
    a remote AC power supply;
    a plurality of subsea power consuming devices;
    a subsea AC power distribution device comprising:
       a watertight housing within which at least one transformer is positioned, the transformer having a primary winding and a plurality of secondary windings;
       an input terminal which is electrically connected to the primary winding and is arranged to be connected to the remote AC power supply;
       a number of output terminals, each of which is electrically connected to a corresponding secondary winding and is arranged to be connected to a corresponding subsea power consuming device; and
       a number of switches arranged within the watertight housing, each of which is arranged to break the connection between one of said output terminals and a corresponding secondary winding;
       wherein each switch includes a corresponding switch actuator; and
       wherein the watertight housing comprises a first compartment and a second compartment which is separate from the first compartment, and wherein the transformer is arranged within the first compartment and the switches are arranged in the second compartment;

a primary electrical connection which interconnects the remote power supply and the input terminal of the subsea power distribution device; and a number of secondary electrical connections which each interconnect a corresponding output terminal of the subsea power distribution device and a corresponding subsea power consuming device.

14. The subsea power distribution system according to claim 13, wherein each secondary winding is provided with a corresponding switch.

15. The subsea power distribution system according to claim 13, wherein each switch actuator is contained within the watertight housing.

16. The subsea power distribution system according to claim 15, wherein each switch actuator is contained within the second compartment.

17. The subsea power distribution system according to claim 13, wherein each switch actuator is arranged external to the watertight housing.

18. The subsea power distribution system according to claim 13, further comprising:

a number of second switches, each of which is arranged to break a corresponding one of said secondary electrical connections;

wherein each second switch is contained within a respective switch unit which is attached to or positioned within a housing for the subsea power consuming device.

* * * * *